United States Patent [19]

Schier

[11] Patent Number: 4,811,807
[45] Date of Patent: Mar. 14, 1989

[54] METHOD AND APPARATUS FOR DAMPING STEERING MOVEMENTS

[75] Inventor: Guenther Schier, Munich, Fed. Rep. of Germany

[73] Assignee: Bayerische Motoren Werke Aktiengesellschaft, Munich, Fed. Rep. of Germany

[21] Appl. No.: 91,025

[22] Filed: Aug. 31, 1987

[30] Foreign Application Priority Data

Sep. 2, 1986 [DE] Fed. Rep. of Germany ....... 3629815

[51] Int. Cl.⁴ .............................................. B62D 5/06
[52] U.S. Cl. .................... 180/141; 180/142; 180/219; 280/276; 280/279
[58] Field of Search ............... 180/141, 142, 143, 219; 280/276, 279, 280

[56] References Cited

U.S. PATENT DOCUMENTS

| | | | |
|---|---|---|---|
| 3,365,015 | 1/1968 | Cadiou | 180/141 |
| 4,598,788 | 7/1986 | Serizawa et al. | 180/141 |
| 4,624,335 | 11/1986 | Shiraishi et al. | 180/142 |

FOREIGN PATENT DOCUMENTS

| | | |
|---|---|---|
| 490695 | 1/1930 | Fed. Rep. of Germany . |
| 2338720 | 7/1978 | Fed. Rep. of Germany . |
| 2851773 | 6/1980 | Fed. Rep. of Germany . |
| 3124181 | 1/1983 | Fed. Rep. of Germany . |

Primary Examiner—Kenneth R. Rice
Attorney, Agent, or Firm—Barnes & Thornburg

[57] ABSTRACT

A method and apparatus for damping steering movements, especially of a motorcycle, in which a steering damper is activated by an electronic evaluation circuit. The evaluation circuit receives signal from an angle sensor, an acceleration sensor and a velocity sensor. It compares the measured values of these sensors with predetermined constant values. If the measured value of the angle sensor and of the velocity sensor exceed their respective threshold value, then the evaluation circuit activates a damping device and increases the damping value of the steering damper. Independently or in conjunction therewith, the evaluation circuit activates the damping device when the measured value of the acceleration sensor exceeds a predetermined value. The method and apparatus prevents steering chatter and steering flutter.

18 Claims, 1 Drawing Sheet

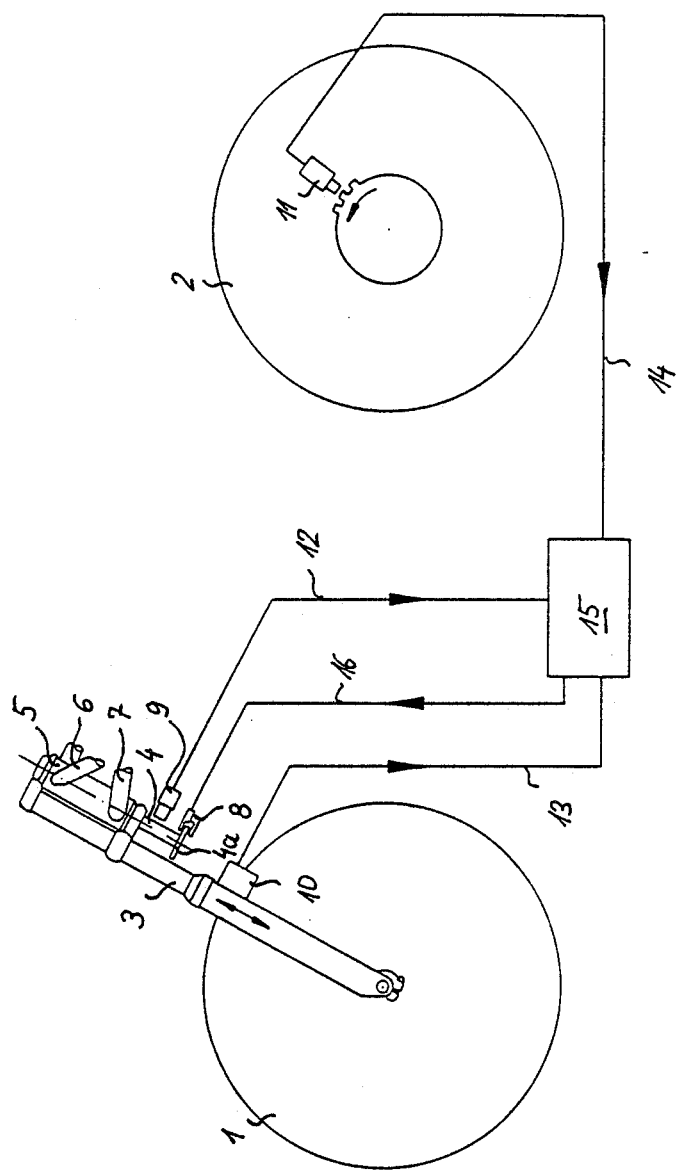

METHOD AND APPARATUS FOR DAMPING STEERING MOVEMENTS

BACKGROUND AND SUMMARY OF THE INVENTION

The present invention relates to a method and apparatus for damping the steering movement, especially of a motorcycle, with a steering damper adjustable in its damping value.

During driving operation of a motorcycle, interferences of the stabilization occur over the entire speed range. On the one hand, a steering flutter is noticeable, for example, at a speed below 100 km/h. At higher velocity, for example, up to 150 km/h, a steering chatter occurs which is caused in particular by road shocks and impacts. At still higher velocities, a so-called high velocity swinging or hunting may finally occur.

In order to reduce or eliminate the two first-mentioned interferences, steering dampers have proved to be of value. For example, the DE-AS No. 23 38 720 shows such a steering damper whose damping value can be adjusted by hand. The once-adjusted damping value remains constant over the entire angular range of the steering deflection.

On the other hand, a steering damper may be counterproductive if the vehicle is moved in city traffic at low velocities and large steering deflections become necessary in that case for purposes of evasive maneuvers. An effective steering damper impairs in this case the handling ability of the motorcycle.

Furthermore, motorcycles with an effective steering damper tend more to high velocity swinging or hunting than those motorcycles without steering damper. It should be mentioned in connection therewith that at high velocities the steering movements of the motorcycle no longer take place by way of steering deflections but by inclining of the vehicle with the driver. The steering therefore remains nearly in the zero position during high velocity hunting or swinging.

It is the object of the present invention to provide a method and apparatus for damping steering movements of the aforementioned type in which the steering damper remains ineffectual in city traffic, also at very high velocities but in contrast becomes effective in velocity ranges in which steering chatter and steering flutter occur.

The underlying problems are solved according to the present invention in that measured values concerning the steering angle and the driving velocity are fed continuously to an electronic evaluating circuit, the evaluating circuit continuously compares the measured values with predetermined constant threshold values and when both measured values exceed their respective threshold value, the evaluation circuit produces a signal for changing the damping value of the steering damper.

According to the present invention, the driving velocity and the steering angle are therefore continuously measured. If they exceed an adjusted threshold value, then the steering damper is activated and is changed in its damping value. The steering damper may thereby involve any commercially available steering damper. It may be constructed on a hydraulic basis; however, magnetic friction dampers can also be used.

It is important according to the present invention that both measured values must have exceeded their threshold value in order to effect a change of the damping value. For only at higher velocities than at the adjusted threshold value and at the correspondingly higher steering angle either a steering wheel chatter or steering wheel flutter will occur.

If the motorcycle drives at very high velocity and if the steering angle deflection remains below the predetermined threshold value, then a high velocity swinging or hunting may nonetheless occur. A permanently effective steering damper, as already mentioned, would be harmful in that case.

Analogously, at low velocities, the steering damper should not to become effective, i.e., the steering will therefore be easy to handle for evasive maneuvers, also when the steering angle exceeds its threshold value.

As already pointed out, the steering chatter stems from road shocks and road impacts. In another embodiment of the present invention the telescoping acceleration of the telescopic fork is measured for the elimination of the steering chatter. If the telescoping acceleration exceeds an adjusted threshold value, which means that the front wheel drives over a road unevenness, then also in this case the steering damper is activated in the direction of a higher damping value. This measure is used in conjunction with the measurement of the driving velocity. However, in this case, only the steering chatter is suppressed. It is more appropriate in many cases to combine the same with the measurement of the steering deflection angle in order thus to combat also the steering flutter.

As a rule, the vehicle is moved in city traffic in a speed range up to 50 km/h. It is therefore meaningful to place the threshold value of the driving velocity within a range between 40 to 60 km/h. It has also been found that the steering deflections at the high velocity hunting lie below +0.5°. Analogously, the threshold value is therefore to he adjusted in an advantageous embodiment at 0.3° to 0.7°.

With certain types of motorcycles, very high damping values are required for controlling the steering chatter. However, such high damping values prevent a restoring or return of the steering system to straight drive. In a further advantageous realization of the present invention, the damping value therefore rises to very high values in case of activation over-proportionally to the deflection angle. After reaching the maximum deflection angle, the electronic evaluation circuit immediately takes the steering damper back to a lower or to the original damping value. This can be achieved in that in addition to the steering angle, also the steering angle velocity of the steering movement is measured. If it approaches zero with a steering angle above the threshold value, this is an indication that the steering deflection has reached its maximum value. If the evaluation circuit receives in this case an angle velocity of zero or nearly zero with a gradient toward zero, then it switches the steering damper to ineffective and the driver can move the steering control handle back into straight driving position.

If acceptable damping forces are sufficient during steering chatters, then this measure can be dispensed with. However, the damping value is then taken back by way of the electronic evaluation circuit to its original value after a lapse of a certain time interval, preferably three seconds.

The method and apparatus according to the present invention are suited in a particularly favorable manner for motorcycles. However, it is not limited thereto. It is also apparent that it can be used with other types of vehicles having steering mechanisms.

BRIEF DESCRIPTION OF THE DRAWING

These and other objects, features and advantages of the present invention will become more apparent from the following description when taken in connection with the accompanying drawing which shows, for purposes of illustration only, one embodiment in accordance with the present invention, and wherein:

The single FIGURE is a schematic view illustrating the method and apparatus in accordance with the present invention.

DETAILED DESCRIPTION OF THE DRAWING

Referring now to the single FIGURE of the drawing, a motorcycle is schematically illustrated in this FIGURE which includes a front wheel 1 and a rear wheel 2. A telescopic fork 3 supports the front wheel 1 and includes a steering shaft 4 which is retained rotatable in a steering head 5. The steering head 5 itself is fixed at the frame which is indicated in the drawing by tubular sections 6 and 7.

The steering shaft 4 includes at its lower end a disk 4a which is surrounded gripper-like by a damping device 8. The disk 4a forms together with the damping device 8 an adjustable magnetic steering damper. Furthermore, an angle sensor 9 is located adjacent to the steering shaft 4 which measures the steering deflection of the front wheel. Additionally, an acceleration sensor 10 is provided at the telescopic fork 3 for measuring the telescoping acceleration of the telescopic fork 3. Finally, a speed sensor 11 is coordinated to the rear wheel 2.

Signal lines 12, 13 and 14 lead from the individual sensors to an electronic evaluation circuit 15. A signal line 16 again leads from this evaluation circuit 15 to the damping device 8. As already mentioned, the drawing only involves a schematic illustration. Possibly intermediate elements might be provided between the signal line 16 and the damping device 8 which, for example, amplify the signal of the electronic unit 15. Also adjusting elements may become necessary which, for example, close or open a by-pass valve in case of a hydraulic steering damper.

In the driving operation, the driving velocity, the steering angle and the telescoping acceleration are continuously measured and are compared in the electronic evaluation circuit 15 with threshold values fixedly adjusted thereat. If the driving velocity and the steering angle exceed the predetermined threshold value, the electronic evaluation unit 15 activates the damping device 8 and changes in this manner the damping value in the upward direction. It also activates the damping device 8 if the telescoping acceleration and the driving velocity rise above the predetermined value.

The electronic evaluation unit 15 may be a commercially available part. However, it can also be assembled in a simple manner by a person skilled in the art. For example, an operational amplifier may be provided in the electronic unit 15 for each sensor which has at its one input a threshold value corresponding to the respective magnitude. The other input is then connected with the respective sensor. The outputs of the operational amplifiers for the angle sensor and the velocity sensor are combined in an AND-element. The output of the AND-element is again connected with the signal line 16 whereas the output of the operational amplifier coordinated to the telescoping acceleration leads directly to the signal line 16.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A method for damping the steering movements by means of a steering damper adjustable in its damping value, comprising the steps of feeding continuously measured steering angle value and driving velocity value to an electronic evaluation circuit, comparing the measured values with predetermined constant threshold values, and producing a signal for changing the damping value of the steering damper when both measured values exceed their respective threshold values.

2. A method according to claim 1, in which a front wheel suspension includes at least one telescopic shock absorber device and a steering damper adjustable in its damping value, comprising the steps of continuously feeding the measured value of the instantaneous telescoping acceleration of the shock absorber device to the electronic evaluation circuit, comparing the measured value of the telescoping acceleration with a predetermined constant threshold value, and producing a signal for changing the damping value of the steering damper when exceeding the threshold value coordinated to the telescoping acceleration.

3. A method according to claim 1, wherein the threshold value for the steering angle lies within the range of about 0.3° to about 0.7° and for the driving velocity within the range of about 40 to 60 km/h.

4. A method according to claim 2, further comprising the step of resetting the damping value of the steering damper by the evaluation circuit to its original damping value after a predetermined time interval.

5. A method according to claim 2, further comprising the steps of producing in the electronic evaluation circuit in case of an increasing measured value of the steering angle a signal for an over-proportional change of the damping value of the steering damper and upon reaching the maximum value of the steering movement transmitting a signal from the evaluation circuit for reducing the damping value.

6. A method according to claim 5, wherein the evaluation circuit receives continuously a measured value concerning the angle velocity of the steering movement.

7. A method according to claim 2, wherein the threshold value for the steering angle lies within the range of about 0.3° to about 0.7° and for the driving velocity within the range of about 40 to 60 km/h.

8. A method according to claim 7, further comprising the step of resetting the damping value of the steering damper by the evaluation circuit to its original damping value after a predetermined time interval.

9. A method according to claim 1, further comprising the steps of producing in the electronic evaluation circuit in case of an increasing measured value of the steering angle a signal for an over-proportional change of the damping value of the steering damper and upon reaching the maximum value of the steering movement transmitting a signal from the evaluation circuit for reducing the damping value.

10. A method according to claim 9, wherein the evaluation circuit receives continuously a measured value concerning the angle velocity of the steering movement.

11. An apparatus for damping the steering movements, comprising a steering damping means adjustable in its damping value, electronic evaluation circuit means, means for feeding measured steering angle values and driving velocity values to the evaluation circuit means, and the evaluation circuit means being operable to compare the measured values with predetermined constant threshold values and producing a signal for changing the damping value of the steering damping means when both measured values exceed their respective threshold value.

12. An arrangement according to claim 11, wherein the arrangement is for a motorcycle.

13. An arrangement according to claim 11, wherein the measured values are continuously fed to the electronic evaluation circuit and the evaluation circuit means continuously compares the measured values with predetermined constant threshold values.

14. An arrangement for damping the steering movements of a motorcycle according to claim 11, comprising a front wheel suspension having at least one telescopic shock absorber means and a steering damping means adjustable in its damping value, the electronic evaluation circuit means receiving continuously measured values concerning the instantaneous telescoping acceleration of the shock absorber means and comparing the same with a predetermined constant threshold value, and the evaluation circuit means being operable to produce a signal for changing the damping value of the steering damping means when the last-mentioned measured value exceeds its respective threshold.

15. An arrangement according to claim 12, wherein the threshold value for the steering angle lies within the range of about 0.3° to about 0.7° and for the driving velocity within the range of about 40 to about 60 km/h.

16. An arrangement according to claim 11, wherein the evaluation circuit means is operable to reset the damping value of the steering damping means to its original damping value after the lapse of a predetermined time interval.

17. An arrangement according to claim 11, wherein the electronic evaluation circuit means is operable to produce with an increasing measured value of the steering angle a signal for an over-proportional change of the damping value of the steering damping means and upon reaching the maximum value of the steering movement transmits a signal for reducing the damping value.

18. An apparatus according to claim 11, wherein the evaluation circuit means continuously receives a measured value concerning the angular velocity of the steering movement.

* * * * *